United States Patent

Luedicke et al.

[15] 3,675,134

[45] July 4, 1972

[54] METHOD OF OPERATING AN INFORMATION STORAGE TUBE

[72] Inventors: Eduard Luedicke, Neshanic; Robert Steven Silver, Kendall Park, both of N.J.

[73] Assignee: RCA Corporation

[22] Filed: May 27, 1971

[21] Appl. No.: 147,391

[52] U.S. Cl. ....................328/124, 313/65 AB, 340/173 CR

[51] Int. Cl. ....................G11c 11/26

[58] Field of Search ....................328/123, 124; 340/173 CR; 313/65 AB

[56] References Cited

UNITED STATES PATENTS

| | | | |
|---|---|---|---|
| 2,743,430 | 4/1956 | Schultz et al. | 328/123 |
| 2,981,891 | 4/1961 | Horton | 328/124 |
| 3,073,989 | 1/1963 | Amsterdam | 328/123 X |
| 3,401,294 | 9/1968 | Cricchi et al. | 340/173 CR |
| 3,474,285 | 10/1969 | Goetzberger | 313/65 AB |
| 3,528,064 | 9/1970 | Everhart et al. | 340/173 CR |

*Primary Examiner*—John S. Heyman
*Attorney*—Glenn H. Bruestle

[57] ABSTRACT

In the operation of an information storage tube including a storage target, comprising a conducting or semiconductor substrate, an insulating storage layer and a conducting grid or mesh, means for scanning the target with an electron beam, and a secondary electron collector adjacent to the target; the storage target is primed by scanning the target with a low velocity beam in a series of steps while maintaining the conducting grid at a low positive potential (e.g., +5 volts) and applying successively higher positive potentials to the substrate, until the difference between the potentials of the substrate and the conducting mesh is about 25 volts, and then reducing the substrate potential enough to reduce the storage layer potential to zero, preparatory to writing. Now, the signal information can be (1) stored on the storage layer, by scanning the target with a high velocity writing beam; (2) read out nondestructively, by scanning the target with a low velocity reading beam; and (3) erased, by scanning the target with a high velocity erasing beam.

10 Claims, 20 Drawing Figures

INVENTORS
Eduard Luedicke &
Robert S. Silver
BY Thomas R. Webb
AGENT

INVENTORS
Eduard Luedicke &
Robert S. Silver

BY Thomas R. Webb
AGENT

INVENTORS
Eduard Luedicke & Robert S. Silver

BY Thomas R. Webb
AGENT

METHOD OF OPERATING AN INFORMATION STORAGE TUBE

BACKGROUND OF THE INVENTION

The present invention relates to information-storage tubes, and particularly to those of the type disclosed in a U.S. Pat. application of R. S. Silver, Ser. No. 789,762, filed Jan. 8, 1969, assigned to the same assignee.

The abovementioned application discloses a novel information storage tube including a storage target that can comprise a two-layer structure of: (a) a semiconductor substrate (or signal electrode) with discrete electrically insulating storage regions thereon, which regions consist essentially of a secondary electron-emissive insulating compound of semiconductor material, or (b) an uninterrupted electrically insulating storage layer of such an insulating compound, on which there is disposed a continuous electrically conducting layer (or signal electrode) in the form of, for example, a grid or network. Alternatively, the target can comprise a three-layer structure made up of a semiconductor substrate; an uninterrupted storage layer of an insulating compound of semiconductor material disposed on a major surface of the substrate; and a continuous layer (or signal electrode) having, for example, a network configuration, disposed on the exposed major surface of the storage layer. The conducting layer can be made of a metal or a semiconductor material, and can be either electrically connected directly to the semiconductor substrate or insulated therefrom.

The operation of a storage tube includes reading out the information stored thereon in the form of an electrostatic charge pattern, by scanning the target with an electron beam. The landing of the electron beam on the various accessible portions of the signal electrode is modulated by the local electrostatic potentials on the insulating storage member. The landing of the beam on the signal electrode provides electrical signals that embody the stored information. During the reading process, positive ions, produced by the collision of electrons of the beam with the small amounts of residual gases in the tube, discharge to some extent the electrostatic charge pattern on the insulating member. As a result, such positive ions reduce the information storage time of the tube.

The storage target is usually primed for the next writing operation by switching the voltage applied to the signal electrode of the two-layer target (e.g., the semiconductor substrate) to a relatively low positive value (e.g., +25 volts) that results (due to capacitive coupling) in a potential of the same value on the insulating storage member, and thereafter scanning the target with an unmodulated beam to reduce the potential of the storage member to zero. During this scanning, electrons land on the target and gradually reduce the potential on the insulating member towards zero. As this potential approaches zero volts, however, the electrons are increasingly attracted to the more positive signal electrode (at +25 volts) and decreasingly attracted to the less positive insulating member, there resulting an undesirable "long tail" effect. Because of the "long tail" effect, a disproportionate amount of time is required to complete this priming of the insulating member.

The information readout capability of the tube (with either continuous or intermittent read-out of the information) is proportional to the capacitance of the storage layer. The erasability of the information is, on the other hand, inversely proportional to such capacitance. A relatively thick insulating member of the target generally results in a lower level of capacitance whereas a thinner insulating member generally results in a higher level of capacitance. Therefore, a relatively thin insulating member is more desirable for purposes of longer information read-out times but is less desirable for speed of information erasure. On the other hand, a thicker insulating member is more desirable for information erasability and for priming but is less desirable for extended information read-out time.

SUMMARY OF THE INVENTION

In the operation of an information storage tube including a storage target comprising a conducting or semiconductor substrate, an insulating storage layer and a conducting grid or mesh, means for scanning the target with an electron beam, and means for collecting secondary electrons emitted by the target; the storage target is primed for the next writing operation by scanning the target with a low velocity electron beam while maintaining the substrate at a relatively low positive potential, below the cross-over potential of the storage layer material, and maintaining the conducting layer at a lower potential than the substrate, to reduce the storage layer potential to the potential of the conducting layer.

DESCRIPTION OF PREFERRED EMBODIMENT

Figure 1:
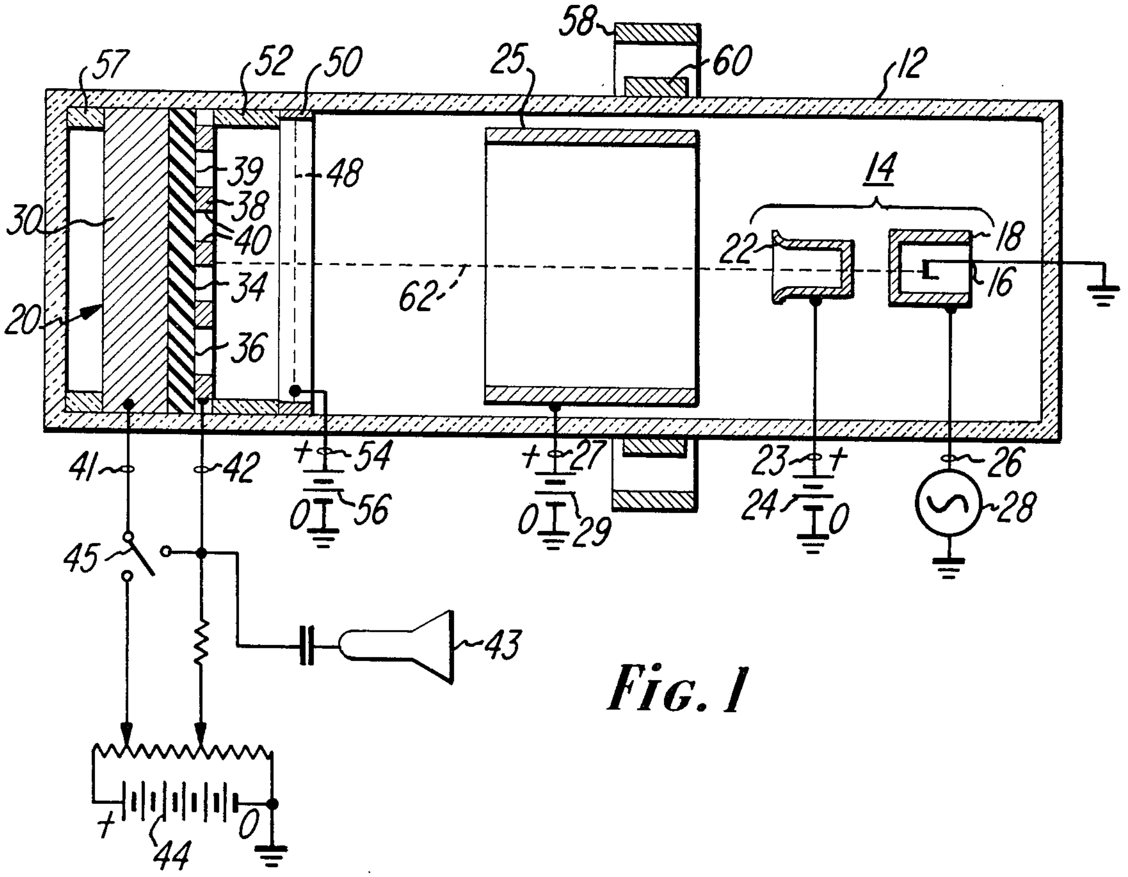
FIG. 1 is a longitudinal sectional view of an information storage tube with which the invention is used.

Referring to FIG. 1, the storage tube 10 comprises an evacuated envelope 2, which may be of any suitable material, such as glass. Within the envelope 12 is an electron beam gun 14 including a cathode 16, a control electrode 18, an accelerating anode 22, and a focusing electrode 25. A storage target 20 is disposed in the envelope 12 opposite the electron gun 14. The accelerating anode 22 is electrically connected by a lead 23 to a potential source 24 and the control electrode 18 is connected by a lead 26 to a source 28 of input signal that is to be stored on the target 20. The focusing electrode 25 is electrically connected by a lead 27 to a potential source 29. The storage target 20 is schematically shown in FIG. 1, and a specific, exemplary target structure 20 is shown in FIG. 2.

Figure 2:
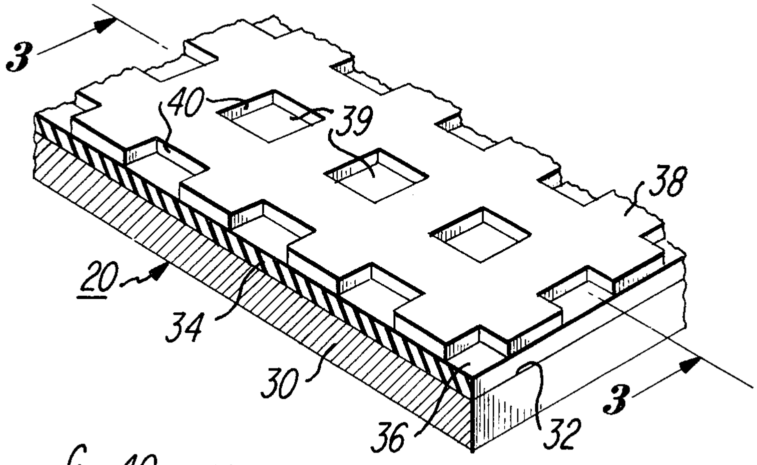
FIG. 2 is a fragmentary perspective view of the storage target of FIG. 1.

In FIG. 2, the storage target 20 comprises an electrically conductive substrate 30, having disposed on a major surface 32 thereof an uninterrupted storage layer 34. The substrate 30 consists essentially of either a metal or a semiconductor material. Such semiconductor material, if used, is preferebly either silicon or germanium, doped to an n+, p, or p+ type conductivity. The storage layer 34 can consist essentially of a secondary electron-emissive insulating compound of a semiconductor material, preferably of the same kind of semiconductor material as that of substrate 30, e.g., the dioxide or nitride of either silicon or germanium. Because it is uninterrupted, the storage layer 34 is free of openings, apertures or other discontinuities therein.

On the exposed major surface 36 of the storage layer 34 there is disposed a conducting layer (or signal electrode) 38 having a network configuration (as shown) or some other configuration (not shown) wherein portions of the storage layer surface 36 are accessible therethrough, the various portions of the conducting layer being in electrical connection with each other (i.e., the layer is continuous). The conducting layer 38 can be made of metal, or a semiconductor material that may or may not be the same as that of the substrate material, and has a thickness of, for example, 2,000 angstroms. The target 20 can be produced in the manner described in the Silver application. The conducting layer 38 covers only a portion of the major surface 36 and is insulated from the conductive substrate 30 by the storage layer 34.

Referring again to FIG. 1, the substrate 30 and the conducting layer 38, which can operate as independent electrodes, are respectively provided with electrical leads 41 and 42. By means of lead 42, both an electrical potential from a multipotential source 44 can be applied to, and an electrical output signal can be extracted from, the conducting layer 38. The output signal may be transmitted to, for example, a display tube 43, or used in another manner. The electrical lead 41 connects the conductive substrate 30 to the potential source so that various electrical potentials can be applied to the substrate 30. Such target potentials applied to the substrate 30 will cause the substrate 30 to produce a potential on the major surface 36 of the storage layer 34, by a parallel plate capacitive effect between the major surface 32 thereof and the major surface 36 of the storage layer 34. This three-layer target 20 can provide higher levels of target capacitance and higher erasing speeds than the two-layer targets discussed above. The storage target 20 is disposed within the storage tube 10 with the storage layer 34 and conducting layer (signal electrode) 38 substantially perpendicular to the axis of the electron gun 14. Between the electron gun 14 and the storage target 20, there is disposed a secondary electron collector electrode 48, which may be in the form of a mesh, supported on a collector support ring 50. The storage target 20 is electrically separated from the collector support ring 50 by an insulating spacer 52. A lead 54 for applying an electrical potential from a potential source 56 is connected to the collector electrode 48. An insulating spacer 57 may be provided between the substrate and the end wall of envelope 12. Disposed outside the envelope 12 are magnetic beam-focusing means 58 and magnetic beam-deflecting means 60. Alternatively, electrostatic deflecting means (not shown) may be used.

Generally, in the operation of the storage tube 10 illustrated in FIG. 1, the electron gun 14 is employed to produce, at different times, any one of a priming beam, a writing beam, a reading beam, or an erasing beam. The cathode 16 of the electron gun 14 is operated at ground potential. The conducting substrate 30 and the conducting layer 38 of the storage target 20 are operated at potentials that are determined by the particular operation (viz., prime, write, read, or erase) being carried out, those potentials being positive with respect to the cathode 16. The focusing means 58 and deflection means 60, respectively, focus the beam 62 and deflect the beam 62 to scan the storage target 20 in raster fashion.

FIGS. 3 through 20 schematically illustrate the storage target 20 of FIGS. 1 and 2 at various phases (viz., prime, write, read, and erase) of operating the storage tube 10 of FIG. 1. The storage target 20 shown in FIGS. 3 through 20 comprises, for example, the conducting substrate 30, which may consist essentially of silicon of the desired conductivity type, the uninterrupted insulating storage layer 34, e.g., one consisting essentially of silicon dioxide, and the electrically conducting layer 38 of metal, such as nickel.

In FIGS. 3–20, illustrative potential values for three respective regions (labeled as A, B and C for explanatory purposes in FIGS. 3 and 15–19) of the storage layer 34, are shown. All potentials shown are with respect to the potential of the cathode 16.

Figure 3:
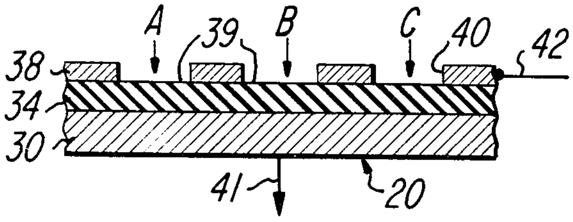
FIGS. 3 through 20 are schematic, fragmentary, sectional views through the target along the line 3–3 of FIG. 2, to explain the operation of the tube.
Figure 4:
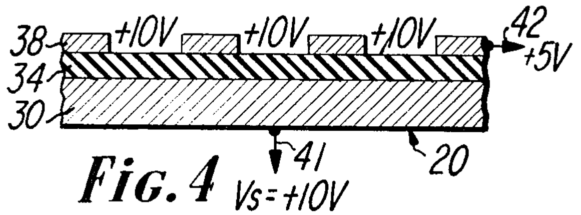
Figure 5:
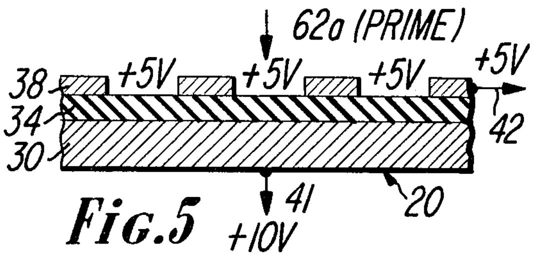

FIG. 3 shows the target 20 in its neutral condition with no potentials applied to the substrate 30 and conducting layer 38, and no potentials stored on the storage layer 34 (i.e., zero volts on all regions A, B and C).

The first step in operating the storage tube is to "prime", or suitably condition, the storage target preparatory to writing information thereon. In the priming operation (FIG. 4) relatively low positive potentials are applied to the leads 41 and 42 of the substrate 30 and the conducting layer 38, the substrate 30 potential ($V_S$) being somewhat higher than the potential ($V_L$) of the conducting layer 38. Values of +10v. and +5v. for $V_S$ and $V_L$, respectively, have been found to be satisfactory. Because of capacitive coupling, the potential on the storage layer 34 is made substantially equal to the substrate potential $V_S$ (i.e., +10v.) rather than to that of the conducting layer (+5v.).

Then (FIG. 5) a low velocity, constant current writing electron beam **62*a* is directed toward the target, the electrons generally landing on the accessible areas of the storage layer 34 in preference to the conducting layer 38, because of the higher positive potential of the former. As electrons impinge on the storage layer, the potential on the storage layer decreases to a level substantially equal to that of the conducting layer 38. It is difficult for the storage layer potential to be reduced to a level significantly below that ($V_L$) of the conducting layer 38** for the reason that, if the storage layer potential were to drop slightly below the conducting layer potential, substantially all of the electrons arriving at the target would prefer to land on the more positive conducting layer so that any further charging down of the storage layer potential would effectively be terminated. It has been found that a single frame scansion of the target by the electron beam is sufficient to charge the storage layer down to the conducting layer potential. Thus, the storage layer potential stabilizes at +5v., or 5 volts below the substrate potential of +10v.

In the next several steps, shown in FIGS. 6 through 13, the potential ($V_L$) applied to the conducting layer 38 is held at a substantially constant level, whereas the potential ($V_S$) applied to the substrate is increased, preferably in equal increments of, for example, +5v. (as shown in FIGS. 6, 8, 10 and 12). With each increase in $V_S$, the storage layer potential is correspondingly increased, due to the capacitive coupling. Between successive increases in the substrate potential, V, the storage is scanned with the low velocity priming electron beam **62*a*, so that the potential on the storage layer 34 is reduced by each such scanning operation between increases in $V_S$, to approximately the applied potential ($V_L$) of the conducting layer 38**.

Figure 6:
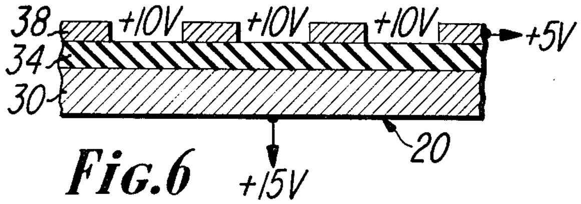
Figure 7:
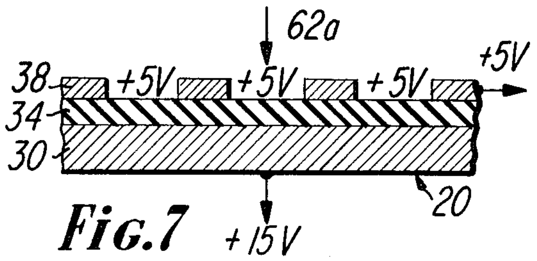

Specifically, for purposes of illustration, in FIG. 6, $V_S$ is increased to +15v. to bring about a corresponding 5v. increase in the storage layer potential to +10v. Then the target is scanned by electrons of beam **62*a* (FIG. 7), these electrons landing primarily on the more positive storage layer 34 in preference to the less positive conducting layer 38**, and thereby, charging the storage layer down to about the conducting layer potential $V_L$.

Figure 8:
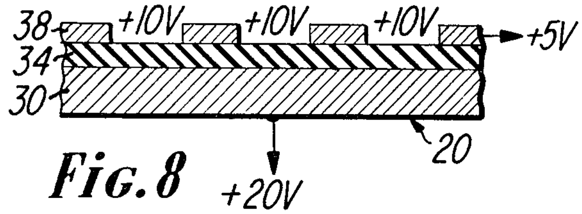
Figure 9:
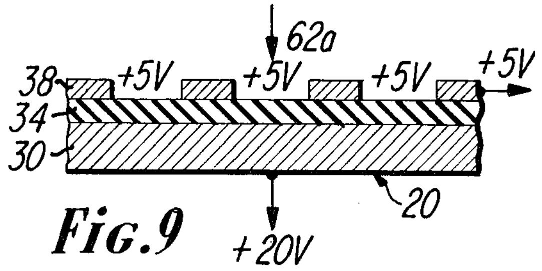

In the next step, FIG. 8, $V_S$ is again increased by +5v. to +20v., thereby causing a corresponding increase in the storage layer potential to +10v. Again the priming beam **62*a* is scanned over the target (FIG. 9**), causing a reduction in the storage layer potential to a level approximating $V_L$. As stated above, it has been found that, for the potential values recited, a single frame scansion is sufficient to cause such a reduction in the storage layer potential.

Figure 10:
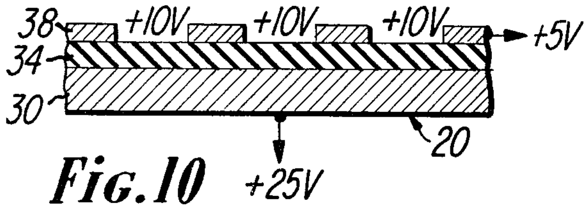
Figure 11:
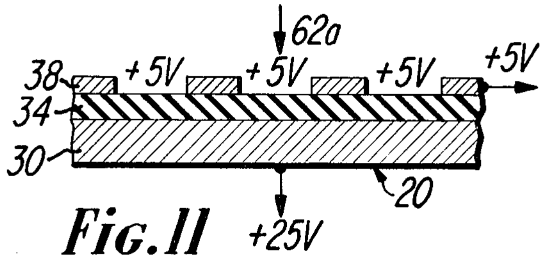
Figure 12:
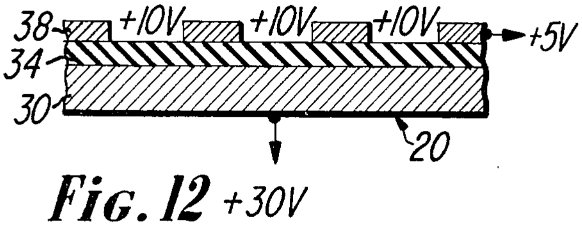
Figure 13:
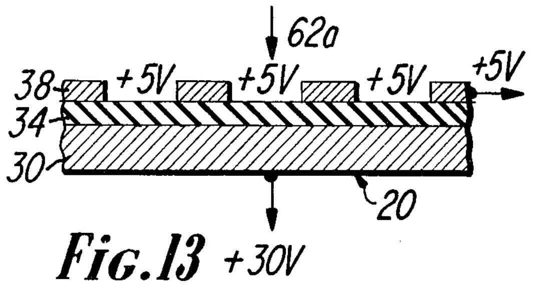
Figure 14:
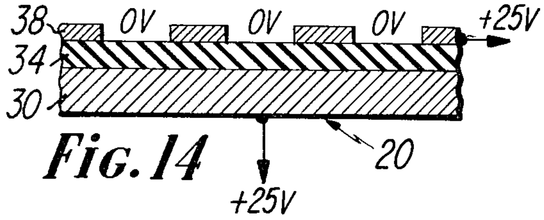

The process of increasing the substrate potential by, preferably, equal increments of, for example, +5v. is further carried out, as shown in FIGS. 10 and 12, with each one of these steps of increasing the substrate potential being accompanied by a subsequent step of scanning the target with the priming electron beam **62*a*, as shown in FIGS. 11 and 13. It is preferred that steps of storage layer potential-increase and electron beam-scanning of the target be continued until the potential difference between the substrate 30 and the storage layer 34 is suitable for substantially nondestructive readout. Such a potential difference is, for example, 25v., which is below the first crossover potential of the secondary emission curve of the storage member 34, such a 25v. difference having been attained in FIG. 13. The final steps in preparing the target for a new write-read-erase cycle are to decrease the substrate potential, $V_S$, to about +25v., as shown in FIG. 14, thereby inducing a zero volt potential on the storage layer 34**, and to increase the conducting layer potential $V_L$ to the same +25v. potential. Thereafter, the write, read, and erase operations can be executed in the manner described below.

Figure 15:
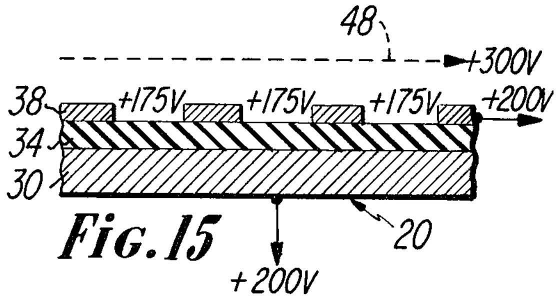

After the storage target has been primed to the condition shown in FIG. 14, the desired signal information may be written (stored) on the storage layer 34 in the following manner. The "writing" on the storage target 20 is achieved by causing emission of secondary electrons from the storage layer 34. First, the applied substrate potential ($V_S$) and the applied conducting layer potential ($V_L$) are increased from +25v. to about +200v., for example, as shown in FIG. 15. Also, a higher potential, e.g., +300v., is applied to the secondary emission collector mesh 48. The 175v. increase in substrate potential causes a corresponding increase to +175 v. in the potential on the storage layer 34, by virtue of capacitive coupling. The amount of the increase in the potentials $V_S$ and $V_L$ should be sufficient to cause the potential on the storage layer 34 to be increased to a level exceeding the first crossover potential on the secondary emission curve for the storage layer 34. For potentials exceeding the first crossover potential, the secondary electron emission ratio will exceed unity. For a silicon dioxide layer, the first crossover potential is about +30v. with respect to cathode potential.

Figure 16:
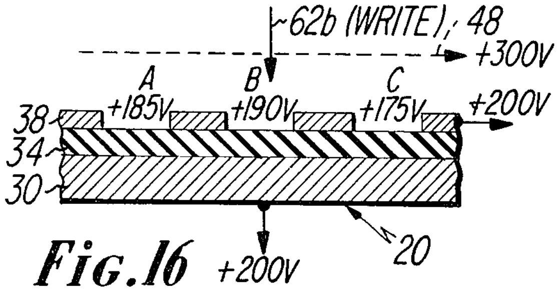

Referring now to FIG. 16, the electron gun 14 is then turned on and a high velocity writing beam 62*b* is caused to scan the target 20 while the substrate potential ($V_S$) and the conducting layer potential ($V_L$) are maintained at +200v. The secondary emission ratio of the storage layer is determined by the target potential. Because the storage layer 34 has a potential (i.e., +175v.) exceeding the first crossover potential value for the storage layer 34, secondary electrons are emitted at a secondary-to-primary ratio greater than one from the storage layer 34 as that layer is scanned by the beam. The instantaneous rate of secondary electron emission is dependent upon the beam current, which is modulated by an input signal applied to the control electrode 18 of the electron gun 14.

Because of the modulation of the electron beam current by the input signal, some portions A and B but not others C, of the storage layer 34 impinged by the beam, exhibit, as shown in FIG. 16, an increase in the potential thereon (e.g., to +185 and +190v., respectively). This is due to more secondary electrons leaving the storage layer 34 at these portions (i.e., A and B) than primary electrons arriving thereat. That is, in this particular case, as the target 20 is scanned, the input signal so modulates the beam current that quantities of secondary electrons sufficient to provide distinguishable changes in potential are emitted by portions A and B but not by portions C which receive no beam current. The variations in potential among portions A and B are due to the different quantity of secondary electrons emitted by each, this difference being caused by the different level of beam current existing as the beam scans each portion A and B. The increased level of potential is preferably at least 10v. below the potentials ($V_S$ and $V_L$, respectively) of the conductive substrate 30 and conducting layer 38, to achieve non-destructive readout. All secondary electrons are collected by the collector electrode 48. The pattern of different potentials on the various portions of the storage layer surface constitutes an electronic image of the electrical signal applied to the control electrode 18.

Figure 17:
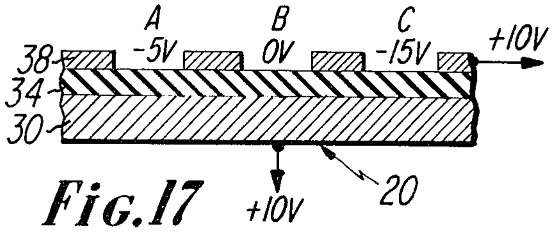

Thereafter, the beam 62*b* is turned off, and the applied potentials $V_S$ and $V_L$ are reduced by a value at least equal to the highest potential (e.g., about +190v.) existing on the storage layer, as shown in FIG. 17. As a result, the applied potentials $V_S$ and $V_L$ in this situation are no greater than about +10v. Because of capacitive coupling, the resulting potentials on the storage layer 34 are either negative or zero, as shown in FIG. 17. For example, the regions A, B and C may have potentials of −5, 0 and −15v., respectively. At this stage, writing has been completed, and information that has been stored in the target in the form of a potential pattern may be read out.

Figure 18:
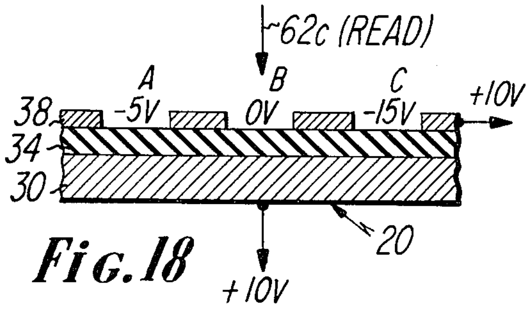

In the reading operation shown in FIG. 18, while the applied potentials $V_S$ and $V_L$ are maintained at +10v., the electron gun 14 is turned on to provide a low velocity, constant current reading beam 62C, which scans the target 20 in raster fashion. The substrate 30 may be electrically connected to the conducting layer 38, as shown in FIG. 8, during the read operation, e.g., by means of switch 45 and leads 41 and 42 in FIG. 1. The electrons of the reading beam 62 are repelled by the negative potentials on the storage layer, and will have more difficulty in landing on those portions of the conducting layer 38 which are adjacent to those regions (e.g., C) of the storage layer 34 having relatively high negative potential. Where the potentials on the storage layer 34 are not so highly negative, (e.g., A) or are of zero potential, (e.g., B) beam electrons are more able to land on the adjacent portions of the conducting layer 38. Hence, the electron flow to the conducting layer 38 is modulated by the negative potential pattern stored on the storage layer 34. Electrons landing on the conducting layer 38 generate an output signal which is transmitted to a display tube 43 for visual display, or utilized in some other manner. Reading in the above manner is done non-destructively, because no electrons land on the storage layer 34. The storage target 20 has very long information retention capability, and hence, the stored information may be read many times without changing the potential pattern stored in the target.

Figure 19:
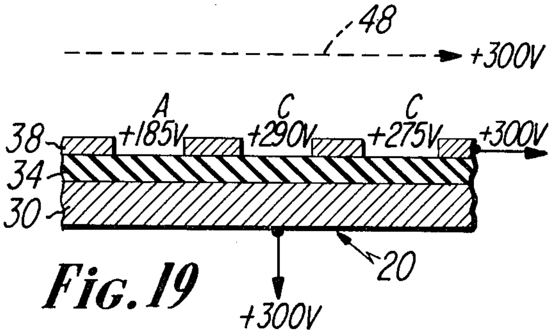

Referring now to FIG. 19, when it is desired to erase the stored information, the substrate potential ($V_S$) and the conducting layer potential ($V_L$) are changed to a value such that the minimum potential on the storage layer 34 will be increased, by capacitive coupling, to a level (e.g., about +275v.) between the first and second cross-over potentials of the secondary electron emission curve. The second cross-over potential for the material disclosed is above 300v. Such a value preferably is substantially equal to the potential, V mesh, of the collector electrode 48, which is about +300v., for example.

Figure 20:
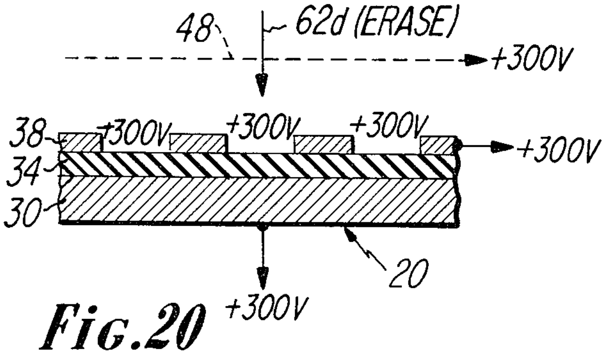

While the substrate potential ($V_S$) is maintained at this increased level of +300v., a high velocity erasing beam 62*d* (FIG. 20) is produced, the beam 62*d* providing electrons which will strike the storage layer 34, which is positively charged as shown in FIG. 19. Such striking of the target by the electrons causes the storage layer 34 to emit secondary electrons, which secondary electrons are collected by the collector electrode 48. This secondary emission causes the potentials on the storage layer regions to increase, to approximately the potential of the conducting layer 38. It has been found that, with the applied potentials in FIG. 19, a single frame scansion of the target by the electron beam 62*d* is sufficient to raise the storage layer potentials to about the collector electrode potential of 300v., as shown in FIG. 20. This erases the pattern of different potentials, which constituted the signal information, on the storage layer 34. Subsequent reduction of the potentials applied to the substrate 30 and the conducting layer 38 to zero restores the storage target to the neutral condition shown in FIG. 3.

We claim:

1. A method of operating an information storage tube of the type comprising:

1. an information storage target including a substrate of electrically conducting material, an uninterrupted storage layer of secondary electron-emissive electrically insulating material disposed on said substrate, and an electrically conducting layer disposed on said storage layer and having a multiplicity of openings therethrough exposing surface portions of said storage layer;
2. means including a cathode for producing an electron beam and for scanning said beam over said target; and
3. means for collecting secondary electrons emitted by said storage layer;

said method comprising the following steps:

a. applying to said substrate a low positive potential below the first cross-over potential of the secondary emission curve for said storage layer material, and applying to said conducting layer a positive potential lower than said substrate potential; and b. scanning said target with an unmodulated low-velocity priming beam, to reduce the potential of said storage layer substantially to the potential of said conducting layer.

2. The method defined in claim 1, wherein said substrate potential in step (a) is at least 10 volts positive with respect to said cathode.

3. The method defined in claim 1, wherein said conducting layer potential in step (a) is about 5 volts positive with respect to said cathode.

4. The method defined in claim 1, wherein said conducting layer potential is applied in a single step, and said substrate potential is gradually applied, said gradual application being done simultaneously with said scanning of said target with said priming beam.

5. The method defined in claim 4, wherein said gradual application of said substrate potential is carried out in a series of consecutive step-wise voltage increments.

6. The method defined in claim 5, wherein after the last of said voltage increments, the difference between the potential of said substrate and the common potential of said conducting layer and said storage layer is about 25 volts.

7. The method defined in claim 6, comprising the subsequent step of reducing the potential applied to said substrate to a value equal to said difference thereby reducing the potential of said storage layer substantially to zero.

8. A method of operating an information storage tube of the type comprising:

1. an information storage target including a substrate of electrically conducting material, an uninterrupted storage layer of secondary electron-emissive electrically insulating material disposed on said substrate, and an electrically conducting layer disposed on said storage layer and having a multiplicity of openings therethrough exposing surface portions of said storage layer;
2. means including a cathode for producing an electron beam and for scanning said beam over said target; and
3. means for collecting secondary electrons emitted by said storage layer;

said method comprising the steps of:

a. applying to said substrate a given low positive potential below the first crossover potential of the secondary emission curve for said storage layer, and applying to said conducting layer a positive potential a few volts lower than said substrate potential; and
b. scanning said target with an unmodulated low velocity priming beam to reduce the potential of said storage layer substantially to the potential of said conducting layer;
c. then repeating steps (a) and (b), with successively higher substrate potentials and substantially the same conducting layer potential, until the difference between the potential of said substrate and the common potential of said storage layer and said conducting layer is about 25 volts;
d. then reducing the potential of said substrate to a value substantially equal to said difference, and increasing the potential applied to said conducting layer to substantially the same value, to produce the condition wherein all portions of said substrate are substantially at zero potential and said substrate and conducting layer are at suitable positive potentials preparatory to a writing operation;
e. then increasing the potential applied to said substrate and to said conducting layer to a potential within the secondary electron emission range of said storage layer material, and applying a higher potential to said collecting means; and
f. scanning said target with a modulated high velocity writing beam embodying the information sought to be stored for a time sufficient to produce an electrostatic charge pattern on said storage layer.

9. The method defined in claim 8, comprising the subsequent steps of:

a. reducing the potential applied to said substrate and to said conducting layer to a potential such that the maximum electrostatic charge potential of said storage layer portions is substantially equal to zero; and
b. scanning said target with an unmodulated low velocity reading beam, the landing of the electrons on said conducting layer being modulated by said electrostatic charge pattern, thereby producing a non-destructive information output to said conducting layer.

10. The method defined in claim 8, comprising the subsequent steps of:

a. increasing the potential applied to said substrate and said conducting layer to a given positive potential such that all of the elemental potentials of said storage layer are raised by capacitive coupling to values within the secondary emission range, and applying to said secondary electron collecting means a positive potential at least as high as that applied to said substrate; and
b. scanning said target with an unmodulated high velocity erasing mean for a time sufficient to raise the potential of all portions of said storage layer substantially to the potential of said substrate; and
c. then removing all of said potentials.

* * * * *